March 17, 1925.
J. C. E. BOURASSA
1,530,227
MECHANICAL MOVEMENT
Filed Dec. 11, 1922
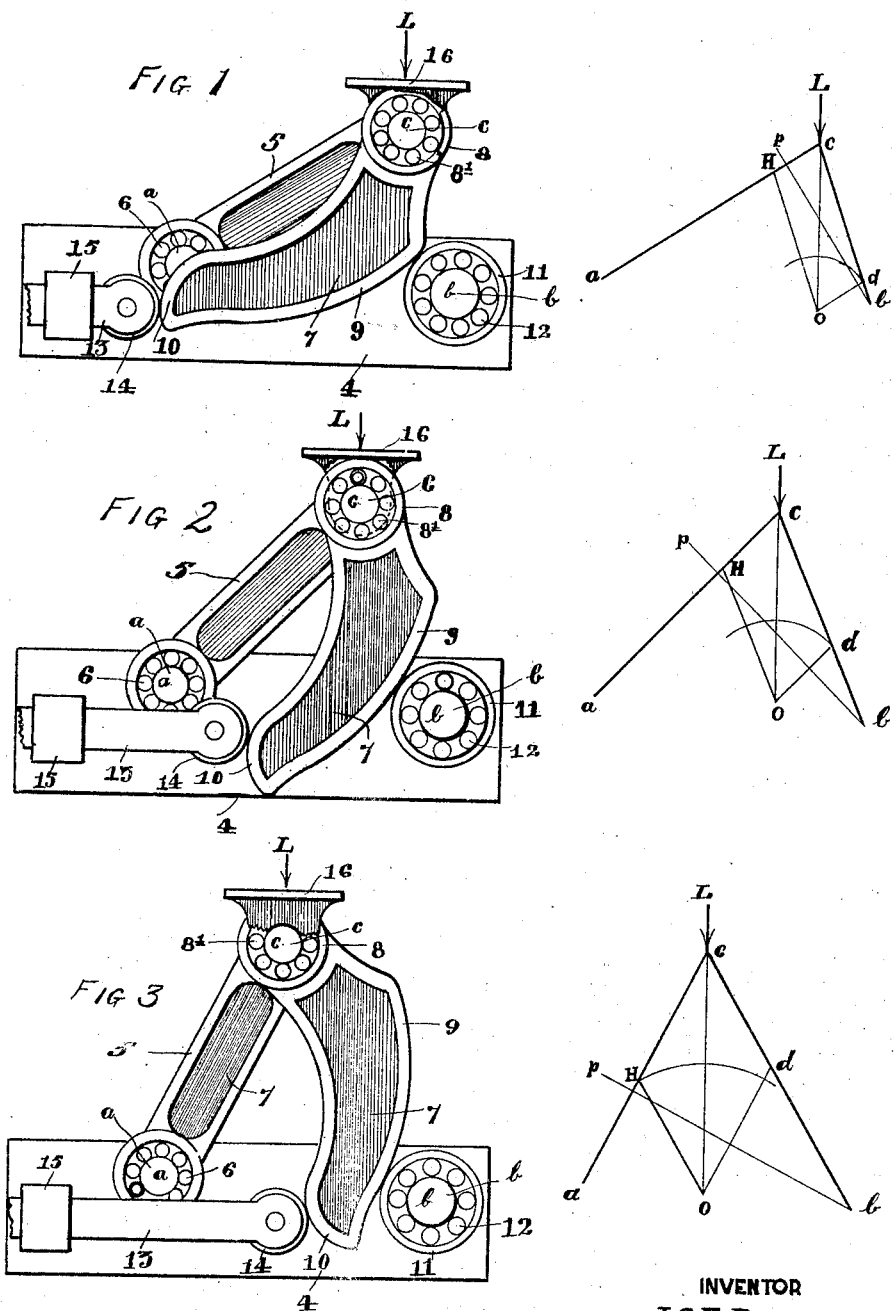
INVENTOR
J.C.E. Bourassa
by Caron&Caron.
Atty's Patented Mar. 17, 1925.

1,530,227

UNITED STATES PATENT OFFICE.

JOSEPH CYRILLE EMILE BOURASSA, OF MONTREAL, QUEBEC, CANADA.

MECHANICAL MOVEMENT.

Application filed December 11, 1922. Serial No. 606,217.

*To all whom it may concern:*

Be it known that I, JOSEPH CYRILLE EMILE BOURASSA, a subject of the King of Great Britain, residing at Montreal, in the Province of Quebec, Canada, have invented certain new and useful Improvements in Mechanical Movements, of which the following is a specification.

The present invention relates to a mechanical movement whereby multiplication of force may be effected within limited space.

It also provides means to vary the direction of applied forces in an efficient manner or with a very low percentage of friction.

One arrangement which may be employed where a heavy load is to be raised a short elevation or when high multiplied pressure is desired is hereafter described. This consists of a cam of special form which is the main element of the invention, in combination with an articulated link and an abutment shown in the drawings attached, in which—

Figure 1 shows the arrangement above mentioned in a closed or lowered position.

Fig. 2 shows the same arrangement in a partly opened or raised position; and

Fig. 3 shows the same in practically its fully opened or raised position.

It will be seen that each figure is accompanied by a diagram in order to compare the resultant of forces.

In the drawings, 4 is a base on which is fixed circular members or axles $a$ and $b$. It will be seen that the distance between $a$ and $b$ is constant in all three figures and in their diagrams, 5 is the link member articulated at its lower end on axle $a$ through antifriction rollers 6 and at its upper end on common member $c$. 7 is the cam member pivoted at its upper end 8 on axle $c$ and fitted with antifriction rollers 8'. This cam has two active faces, that is, 9 being the abutting face and 10 the acted face. The face 9 rests on an antifriction cylinder 11, which is mounted by means of antifriction rollers 12 on axle $b$ which is the abutment.

It is understood that force is applied on acted face 10 of the cam and in this case this is done by means of a rod 13 fitted with an antifriction wheel 14. This rod is carried in a guide 15 fixed on the base. Of course, the pressure of rod 13 may be derived from any source such as hand or from a screw or steam or air pressure. 16 represents a plate intended to support a load or to apply pressure derived through this arrangement. This plate is mounted on common axle $c$, as better shown in Fig. 3.

The face 10 of the cam 7 is curved in such a way that it will present at various positions a surface in a plane approximately perpendicular to rod 13, thereby removing excessive strain on the rod and friction in its bearings. The curve of face 9 is such that it will present an angle with the abutment $b$ in relation to the link 5 inversely proportional to the load on the abutment, thereby resulting in a faster angular movement of link 5. This will also bring the result that the pressure at the plate 16 will remain constant, which is an object of the invention.

These facts will be more clearly understood by referring to the diagrams where L represents the load or the resulting pressure; $a$—$c$ represents the line of force of the link 5; $c$—$b$, the line of force between the upper part of the link at $c$ and the abutment $b$.

In Fig. 1, it will be seen, by referring to the diagram, that the load on the cam is approximately 175 per cent of that on link 5 since O—H and O—$d$ are equal to the lines of force $c$—$b$ and $c$—$a$, respectively. The line $b$—P represents the result of the leverage of the second class between the link 5 and the abutment $b$.

In Fig. 2, it will be seen on glancing over lines O—H and O—$d$, that the load $b$—$c$ has decreased to approximately 155 per cent of the load $a$—$c$ but it will be noticed that the angular movement of $a$—$c$ has increased approximately 18 per cent as shown by $b$—P.

In Fig. 3, it is clear that the link 5 is receiving the greater load since O—$d$ is greater than O—H, the load on $c$—$b$ being approximately 90 per cent of that of $c$—$a$, or a decrease for $c$—$b$ of 60 per cent, but it is also clear, as indicated by line $b$—P, that the angular movement of $a$—$c$ has increased inversely, leading to the desired result of constant load at 16.

It is thought that, although the illustrations have not been made with exact measurements, they are clear enough to explain the working and show the different advantages.

Were the described arrangement to be replaced by a toggle, two links corresponding to link 5 would have to be coupled end to end, requiring twice the space, also an uneven lifting motion or uneven pressure would be obtained, this drawback being obviated by the present invention.

I claim:—

1. In a mechanical movement as described, an abutment, a link member, one end of which is stationary in relation with the said abutment, a cam pivoted to the other end of said link member, the angular face of said cam resting on said abutment; the working angle of said cam varying inversely proportional to the load on said abutment to proportionally increase the angular movement of said link.

2. In a mechanical movement as described, an abutment, a link member having one end thereof stationary in relation with said abutment, a cam pivoted at the other end of said link member, said cam having an acting face and an acted face, the acting face of said cam resting against the said abutment, and means acting on the acted face of said cam to actuate the same.

3. In a mechanical movement as described, an abutment, a link member, said link member having its axis at one end in fixed relation to the said abutment, a cam pivoted on said link member, said cam having its face resting on said abutment, the angle on any point of the face of the cam resting on the abutment being constant to the angular plane of the link member.

4. In a mechanical movement of the class described, an abutment, a link member, said link member having its axis at one end in fixed relation to the said abutment, a cam having an acting face and an acted face pivoted on said link member, the angle on any point of the acting face of the said cam resting on the abutment being constant to the angular plane of the link member and the acted face at any position of the cam being in a plane perpendicular to the line of force actuating said cam.

5. In a mechanical movement as described, an abutment, a link member having one end stationary in relation with said abutment, a cam pivoted at the other end of said link member, said cam having an acting face and an acted face, the acting face of said cam resting against the said abutment, means acting on the acted face of said cam to actuate the same; the working angle of said cam varying inversely proportional to the load on said abutment to proportionally increase the angular movement of said link-member.

Montreal, Quebec, this 25th day of November, 1922.

JOSEPH CYRILLE EMILE BOURASSA.

In the presence of:
DORIS H. CORRIGAN,
MARION E. VIAN.